United States Patent [19]

Albert

[11] 4,109,534
[45] Aug. 29, 1978

[54] APPARATUS FOR MONITORING ACCELERATION

[75] Inventor: William Charles Albert, Boonton, N.J.

[73] Assignee: The Singer Company, Little Falls, N.J.

[21] Appl. No.: 806,027

[22] Filed: Jun. 13, 1977

[51] Int. Cl.² .......................... G01P 7/00; F42C 15/24
[52] U.S. Cl. ....................................... 73/503; 73/509; 73/515; 102/223
[58] Field of Search ................. 73/503, 509, 515, 516, 73/382 R; 102/49.6, 70.2, 76, 78, 80, 81, 82

[56] References Cited

U.S. PATENT DOCUMENTS

| | | | |
|---|---|---|---|
| 2,938,461 | 5/1960 | Rabinow | 102/78 X |
| 3,150,591 | 9/1964 | Gay et al. | 102/84 |
| 3,332,354 | 7/1967 | Silvers, Jr. et al. | 102/76 R |
| 3,602,049 | 8/1971 | Albert | 73/503 |

Primary Examiner—James J. Gill
Attorney, Agent, or Firm—Thomas W. Kennedy

[57] ABSTRACT

There is disclosed an apparatus for monitoring acceleration of a body which utilizes liquid flow technology thus avoiding the need for electrical power. The apparatus includes steel balls of predetermined mass (hereafter "proof masses") disposed in annular cavities of a casing, the cavities containing a damping fluid. The cavities are grouped in pairs, each pair aligned with a principal axis of the body. The pairing allows for detection of acceleration in opposite directions along the respective axis.

Movement of the proof masses in these respective cavities is proportional to the time integral of acceleration along the corresponding axis. This movement develops a force which opens a check valve arrangement allowing for displacement of the fluid through a temperature compensating mechanism to a first piston-chamber arrangement which registers the total movement of all such proof masses. Fluid is returned to the cavity by a second path connected between the cavity and the chamber.

Disposed in a second chamber is another piston like arrangement. The piston or float member is in a neutrally buoyant condition. When the apparatus is made operable, the float member is urged from an initial position to a second one which takes a prespecified amount of time. If during this time, the total movement of the proof masses (as combined by the movement of the piston in the first chamber) reflects a time integral of acceleration above a predetermined amount, the first piston interrupts the movement of the float member.

Thus the apparatus is suitable for registering when a "zero" G condition has existed for a prespecified period of time, in that, under such a condition, the piston in the first chamber will not have moved the distance required to interrupt the movement of the float member.

23 Claims, 4 Drawing Figures

APPARATUS FOR MONITORING ACCELERATION

BACKGROUND OF THE INVENTION

This invention relates generally to an all mechanical acceleration detection instrument, and more particularly, one which is adapted to detect the existence of a "zero" G condition over a predetermined time interval.

With the advent of the space age, weightlessness or "zero" G is a condition which is experienced by orbiting satellites, missiles and other vehicles projected out beyond the Earth's gravitational pull.

Under varying circumstances, depending on the application, it becomes important to be able to detect this "zero" G condition. For example, where intercontinental ballistic missiles are concerned, where these vehicles are carrying nuclear war heads with their potential for devastating destruction, it is important that some fool proof scheme be implemented which precludes these missiles from being placed in an armed condition or, even detonating prematurely.

In such an application, obviously, it is only desirable to have the missile armed when it is in its ballistic or unpowered portion of flight before reentry. Prior to that, the vehicle or missile must be maintained in a "safe" condition so as to avoid the obviously devastating effects of a fall back to earth or detonation on the ground while the missile is transported.

If the trajectory of a missile is analyzed, it is seen to include three basic segments. The initial liftoff phase, the ballistic or unpowered mode during which time the missile is arching through space and being redirected upon reentry towards its target, and the reentry phase of the flight. Typically, the ballistic or unpowered mode which includes the weightless or "zero" G portion of the flight, will extend for a relatively, significant portion of time. Typically, such a condition might exist for 10 minutes. Recognition of this fact enables the development of a safing-arming scheme which precludes the premature firing of the war head on the missile. This is due to the fact that a "zero" G condition cannot be simulated on Earth for such a period of time. Therefore, if an apparatus could be developed which was responsive to the existence of a "zero" G condition for this period of time, and the firing sequence of the missile included the operation of this apparatus as a portion thereof, the premature firing could be avoided.

Of course, the importance of such an apparatus to the proper functioning of other space satellites or vehicles is apparent.

For other reasons, there is no satisfactory method of performing this function. Deficiencies of presently available systems include large size, over complication, radiation susceptibility, large electrical power requirements, and poor reliability.

It is therefore a primary object of this invention to provide an apparatus which is capable of monitoring a "zero" G condition for a specified period of time and yet which is relatively small, simple, and substantially all mechanical so as to require minimal electrical power and to be insensitive to the effects of radiation.

SUMMARY OF THE INVENTION

Towards the accomplishment of these objectives and others which will become more readily apparent in the accompanying drawings and following description, there is described an apparatus for monitoring the acceleration of a body which utilizes liquid flow technology. The apparatus comprises a casing which, typically, has three pairs of cavities, which, when the casing is mounted to the vehicle or body to be monitored, are aligned with the principal axes of the vehicle. The pairing of cavities for each principal axis allows the detection of acceleration in opposite directions along that axis. Where the vehicle may be expected to spin during the "zero" G condition, the cavities preferably will be annular shaped, with two pairs thereof disposed in a circumferential relationship around the vehicle centerline with the third pair of cavities disposed parallel to said centerline.

Disposed in the cavities will be a proof mass and damping fluid, the proof mass of predetermined density so that its movement in the cavity in response to an acceleration along the respective axis will be proportional thereto.

A first chamber including a float member disposed in a damping fluid in a neutrally buoyant condition, is urged from a first position in that chamber to a second position by means such as a spring. The neutrally buoyant condition makes the float member insensitive to vehicle acceleration. The float member further includes a fluid passage means connecting the portion of the chamber on either side of the fluid member so as to allow a path for displaced fluid.

Means are provided which total the movement for each of the proof masses. In a preferred approach, this means includes a check valve arrangement which communicates with the space between each of said proof masses and the end of its respective cavity. The check valve arrangement is interconnected in such a way that in the preferred embodiment, the valve connected to the cavity wherein the proof mass is experiencing the greatest acceleration, will be opened. A first fluid passage is connected between the check valve arrangement and a second chamber wherein there is disposed another float member in a neutrally buoyant condition. The fluid passage through the opened check valve proceeds through the first passage into the second chamber resulting in the displacement of the second float member. Fluid is returned to the corresponding cavity through a second fluid passage connecting this second chamber to the check valve arrangement.

The second float member totals the movement of all of the proof masses and, if it exceeds a predetermined amount, an extension of that second float member is interposed in the travel path of the first float member. This interrupts the latter's movement and precludes the first float member from triggering a monitoring contact which would have otherwise indicated the existence of a "zero" G condition for a prespecified amount of time. Of course, if the combined movement of the proof masses as reflected in the displacement of the second float member does not exceed a certain amount, the first float member is allowed to proceed to that contact point whereupon the "zero" G condition for the period of time required is indicated.

BRIEF DESCRIPTION OF THE DRAWINGS

Reference should now be made to the following description and the accompanying drawings for a better understanding of the nature and objects of the present invention. In the drawings.

DESCRIPTION OF THE PREFERRED EMBODIMENT

The present invention utilizes the liquid flow technology employed by the assignee of this application in its line of integrating accelerometers. Typical of these type devices are the various sensors described in U.S. Pat. Nos. 3,239,620; 3,481,204 and 3,771,368.

These patents described devices which typically will integrate vehicle acceleration utilizing substantially, a purely mechanical arrangement. The apparatus described in these patents exploit the principles of hydraulics to effect a measurement of acceleration through the integration of that acceleration as determined from the movement of a mass in a fluid; the movement of that mass representing the time integral of the vehicle acceleration.

Figure 1:
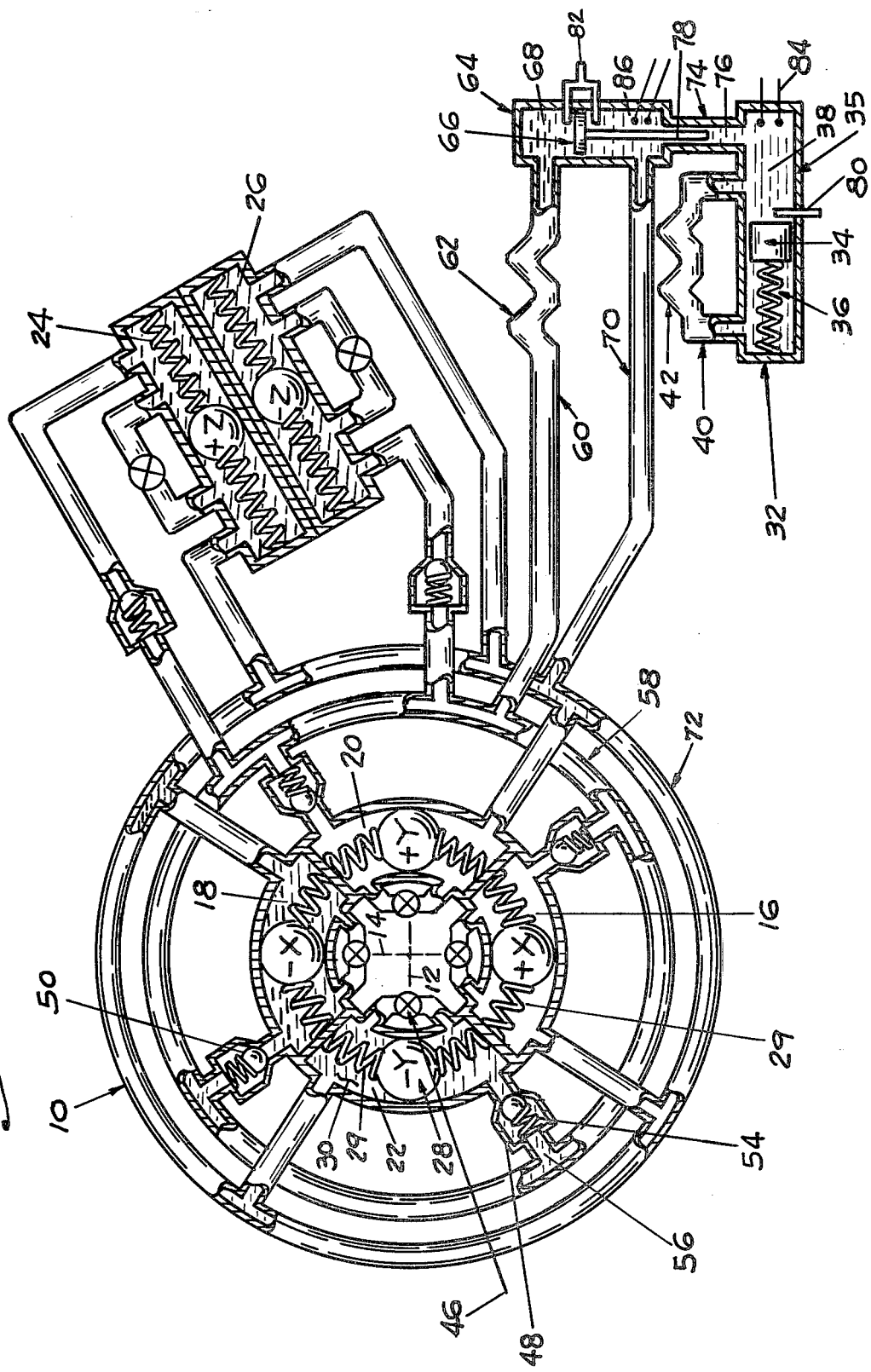
FIG. 1 is a diagrammatic view illustrating the theory of operation of the accelerometer of the present invention.

Referring now to FIG. 1, there is shown in diagrammatic form an apparatus for monitoring acceleration of a vehicle or other body. The apparatus comprises a casing 10 having suitable mounts for securing to the vehicle or body. The casing has principal axes which include the X and Y axis, 12 and 14, and the Z axis which is perpendicular to the plane of the other two and which would be into the plane of the drawing. These axes align with the principal axes of the vehicle when the casing is mounted thereto.

The casing includes a first pair of annular cavities, 16 and 18, disposed therein and aligned, substantially, with the X axis of the vehicle when the casing is secured thereto. A second pair of cavities 20 and 22 aligned substantially at right angles to the X axis cavities are disposed parallel to the Y axis 14. These latter pair of cavities are also annular in shape. The two sets of cavities are disposed circumferentially about the vehicle centerline or Z axis. This arrangement eliminates the effect on the sensing masses due to centripetal acceleration, since, for a constant spin rate of the vehicle about its centerline, the sensing masses will not move circumferentially.

Two additional cavities or bore are made in the casing and run parallel to the vehicle centerline or Z axis. These are cavities 24 and 26. These need not be annular in construction in that they are parallel to the spin axis of the vehicle and thus do not experience the centripetal acceleration.

Disposed in each of the cavities is a sensing or proof mass shown typically at 28. These sensing masses are typically steel balls which are disposed in the cavities and maintained in an equilibrium position by a pair of bias springs 29 which have substantially identical characteristics and which exert a force on the balls which is equivalent to approximately 0.1 g. The equilibrium position for each ball will vary slightly due to the effects of misalignment between the cavities and their respective axes. These effects will be discussed later. Each of the sensing masses responds to an acceleration along one of the principal axes. For the frame of reference set up earlier, the axis of reaction for the sensing masses shown in FIG. 1 are indicated on the respective ball. I.e., the sensing mass designated "−Y" will move within its cavity 22, in response to an acceleration along the Y axis, but only an acceleration in one direction. Likewise, the sensing mass designated "+Y" will respond with movement in its respective cavity 20 to acceleration, again along the Y axis but in direction opposite to that to which the "−Y" sensing mass responds. Similary for the "X" and "Z" sensing masses.

Also disposed in each of the cavities is a damping fluid 30 much like the type disclosed in the sensors described in the aforementioned patents. Preferably it is a silicone fluid which is extremely inert. It is available in a wide range of viscosities, having excellent newtonian properties and a low temperature-viscosity sensitivity.

The system "clock" is made up of a first chamber 32 which includes a first member or piston 34 disposed in an appropriately sized cavity 35. Connected between one end of the piston 34 and the oppositely disposed end of the cavity 35 is a spring 36 which can urge the piston 34 from a first position in the chamber to a second position therein in a predetermined time.

Also disposed in the cavity 35 is damping fluid 38 having similar characteristics to the fluid disposed in the sensing mass cavities. The piston 34 is designed to be neutrally buoyant in the damping fluid in order that it be insensitive to acceleration of the vehicle.

Connecting opposite ends of the cavity 35 is a fluid passage means 40. It includes flow restricting means 42 which provides a resistance to the flow of fluid therethrough. The restricting means operate in a manner similar to the temperature compensating, damping mechanism described in the 3,239,620 patent. Its characteristic with respect to flow will vary with temperature so as to compensate for change in fluid viscosity and other temperature sensitive effects.

Interconnecting the portions of the sensing mass cavities disposed on opposite sizes of each mass is a means, 46, for equalizing the pressure conditions on either size of the mass. This is desirable before the apparatus is used to monitor the acceleration of the body or vehicle in order to restore the proof masses to an equilibrium position. They may include simple bypass valves which are operated in response to an appropriate command signal.

Means are provided which respond to the movement of the proof masses and interact with the movement of the piston 34 so as to interrupt the latter if the time interval of the vehicle acceleration exceeds a prespecified amount. These means include a series of check valves shown typically at 48. These are connected to that end of the respective sensing mass cavity towards which the corresponding proof mass will move in response to vehicle acceleration. The check valves are, again, a simple ball type valve which permits flow in one direction. The balls 50 are of a material equal in density to the damping fluid 30 so as to create a neutrally buoyant condition and thus assure insensitivity to acceleration or gravity. A light spring 54 exerts a slight closing force on the ball 50 so that a predetermined threshold pressure will be needed to open them.

The exit orifice 56 of each of the check valves are interconnected by a fluid passage 58. Connected thereto is an additional fluid passageway 60 which is serially connected to a flow restrictor 62 of the type described above and in the aforementioned '620 patent. It, likewise, compensates for the effects of temperature on fluid viscosity and other system components. The latter is in turn connected to a second chamber 64 in which is disposed a second float or piston member 66 and damping fluid 68. Again, the design of piston 66 is such that it is maintained in a neutral buoyant condition and thus insensitive to vehicle acceleration.

A return fluid passage means comprising 70 and 72 interconnects the opposite side of the chamber 64 with the sensing mass cavities—however, the end thereof other than the end to which the check valves are connected.

Interconnecting the first and second chambers, 32 and 64, is a passageway 74. Extending from the piston member 66 is a protrusion or arm 78 which is aligned with the opening in the passageway 76 so as to pass therethrough when the piston moves in response to the displaced fluid as described below.

Disposed in each of the first and second chambers in cooperative relationship to the respective pistons, are releasing mechanisms 80 and 82. These are connected to a suitable solenoid which, in response to an initiating signal, withdraw from the position indicated in FIG. 1, out of the path of each piston, in order that they may respond according to the principles of the invention. This same unlocking mechanism would be connected in a suitable fashion to the pressure equalizing means 46 in order that these may be closed after the balance condition is established.

Disposed at the ends of each of the chambers 32 and 64 are a set of contacts 84 and 86 which are activated when their respective pistons travel the specified distance within each, to thus give an indication of that event. This will further be described along with the operation of the apparatus hereafter.

OPERATION

The presently described invention is designed to begin operation after the vehicle has achieved a "zero" G condition and, typically, after vehicle spin-up, if any, has occurred.

During vehicle launch and prior to spin-up, the release pins 80 and 82 are in place and the equalizing means 46 are open.

Figure 2:
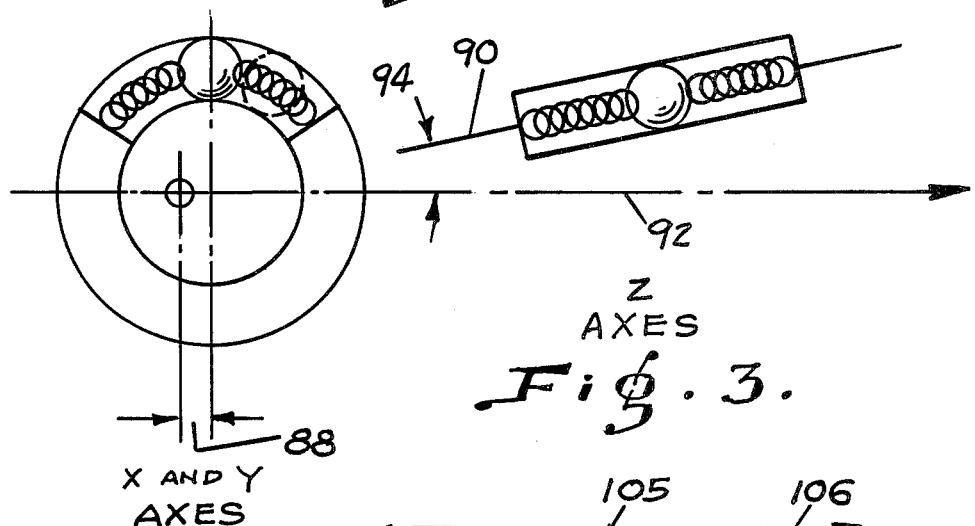
FIG. 2 is a schematic presentation which shows the effect of misalignment in the equilibrium positions of the proof masses used in the invention.

During this phase of operation the motion of the sensing masses 28 is lightly damped due to the low fluid flow restriction of the valves 46. Under these conditions, equilibrium of the respective ball positions is quickly achieved. FIG. 2 illustrates the effects on the equilibrium positions of the sensing masses due to the misalignment between the axes of the casing and those of the vehicle. The solid indication of the sensing balls reflects a situation where there would be perfect alignment, whereas the dotted position reflects the location of the sensing masses for the radial and angular misalignments of the respective axes to the corresponding vehicle axis. So called radial misalignment between the X and Y casing axes and the vehicle, X and Y axis, is shown by the distance 88. The angular misalignment between the axis 90 of the "Z" sensing masses and the vehicle centerline 92 is known as angular misalignment and is depicted by the angle 94. The actual amount of misalignment tolerable becomes a tradeoff with the desirable instrument sensitivity.

When the vehicle has achieved the "zero" G condition and spin-up has been obtained, the ball quickly find their respective equilibrium positions, at which time the initiation of the sensor operation occurs. The unlocking mechanism referred to above is actuated and the pins or releasing means 80 and 82 are withdrawn from the indicated positions and the bypass valve or equalizing pressure means 46 closed. The piston 34 begins its motion in the direction of closing the contacts 84. Unless interrupted, this closure will be achieved in a predetermined time which typically might run on the order of 10 minutes.

Motion of the piston 66 becomes proportional to the integral of the vehicle acceleration as sensed by the masses 28. The acceleration integrated by the proof masses will be that acceleration which is a deviation from the equilibrium conditions of zero G and spin. The fluid displaced by each sensing mass will be a measure of the component of vehicle acceleration integral along the corresponding sensing axis.

Because of the check valve arrangement, only one sensing mass at a time, the one experiencing the highest component acceleration along its sensing axis, will be displacing fluid in its respective cavity. This is because this particular ball sets up the highest pressure differential which acts through its corresponding check valve to hold closed the remaining check valves.

When the balls sense an acceleration, a pressure differential is set up across the ball due to the inertial force and the ball cross sectional area. Since the bypass valves 46 are closed, the flow caused by this pressure differential must be through the check valve; and, again, the valve associated with the ball experiencing the highest component of acceleration.

Figure 3:
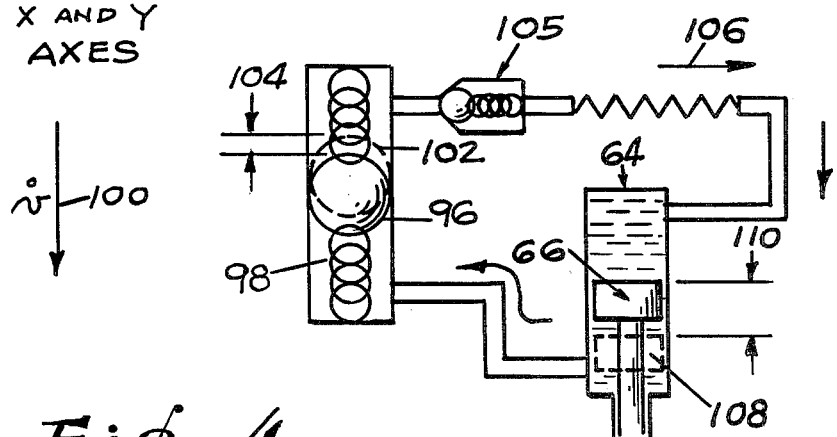
FIG. 3 is a schematic view of a typical response of one portion of the apparatus to vehicle acceleration.

As noted, again, because of the check valves, the fluid flow is in only one direction. FIG. 3 illustrates with just one ball how this fluid flow causes motion of the piston number 66. The proof mass 96 is shown in its equilibrium position in the corresponding cavity 98. When the vehicle experiences an acceleration in the direction shown by arrow 100, the proof mass 96 in response to the force exerted thereon moves with time to a second position 102. The distance 104 represents the movement of the ball for a period of time in response to the particular acceleration.

When the ball in response to this acceleration moves within its respective cavity, a pressure differential is set up across the ball due to the inertial force and the ball cross sectional area. Since the valves used to equalize the pressure on either side of a proof mass have been closed at this point, the flow caused by this pressure differential must be through the corresponding check valve 105 and accompanying fluid passageways in the direction of arrow 106.

This fluid flow upon entering the second chamber 64 causes the second piston 66 to be displaced to a new position shown by the dotted lines 108 for a resulting movement shown by the arrows 110.

The flow of fluid due to the movement of each of the proof masses, as each in turn senses the largest component of vehicle acceleration, accumulates and manifests itself as motion of the piston 66. Thus, the total movement of the piston 66 is proportional to the time integral of the highest component of acceleration at any given time along a respective sensing axis.

Figure 4:
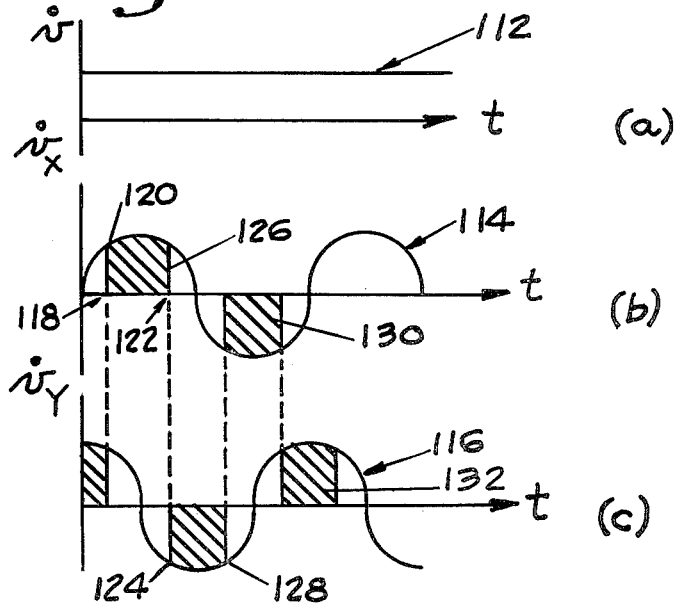
FIG. 4 is a graphic representation showing how the effects of radial acceleration are experienced by the present invention.

FIG. 4 illustrates how the check valve arrangement depicted in FIG. 1 which allows for fluid flow in just one direction, eliminates any effect due to the radial acceleration of the spinning vehicle. FIG. 4(a) shows in graphic form a constant acceleration, 112, as experienced by a spinning vehicle. The effect of this steady acceleration on the proof masses disposed in the X and Y cavities is shown by curves 114 and 116, respectively. The effect is seen to be sinusoidal.

At time 118, presuming for the moment that the acceleration along the Z axis is zero, it is seen that the magnitude of the acceleration experienced by the +X proof mass is on the rise and that at time 118, the magnitude 120, exceeds the magnitude of the acceleration experienced by the +Y proof mass. This is the case up until time 122. At this point the acceleration experienced along the +X axis is decreasing and drops below, in magnitude, the acceleration experienced by the −Y proof mass as shown at point 124. The integral of the accelerations along the +X, −Y, −X, and +Y axes are shown by shaded areas 126, 128, 130 and 132.

Because of the check valve arrangement allowing for flow in just one direction, the response of the system to a sinusoidally varying radial acceleration 114 and 116 is such that it is effectively half wave rectified.

All of the integration taking place causes fluid flow in the same direction, resulting in combined movement of the safing piston, 66, proportional to the acceleration, 112.

As described, just one ball, that is, the one experiencing the largest component of vehicle acceleration, will be integrating at any given time. It can be seen that the component of vehicle acceleration experienced by any one of the sensing axes will be between the following two extremes:

(1) Parallel with one of the sensing axis where the acceleration would be fully integrated;

(2) the condition where vehicle acceleration is equally divided between the 3 orthogonal axes, with the component along any one axis equal to $1/\sqrt{3}$ of full vehicle acceleration. Thus in this extreme only 58% of the acceleration will be integrated.

The two extremes are special cases and the acceleration being integrated falls between 100% and 58% of the actual. If one takes the mean of these two valves, 79%, as the nominal, it is seen for this arrangement, that 79% plus or minus 21% of the vehicle acceleration will be integrated. This scaling difference must be considered in determining what the allowable integral may be before interrupting the movement of piston 34.

Because of the large range of fluid viscosities, flow restrictions, proof mass sizes and piston sizes that are possible with this system, the allowable range of permissable acceleration integrals is very large.

Because movement of the piston 66 depends on the magnitude of the acceleration time interval, the present apparatus is insensitive to shocks of high acceleration amplitude but short duration. This shock insensitivity is due to the low acceleration time-integral of most shock pulses.

The apparatus of the present invention is also insensitive to low level noises and vibration due to the small bias forces exerted on the check valve balls such as 50. The check valve mechanism provides for a threshold acceleration below which no integration takes place.

Alternate arrangements to the scheme described above can have each of the proof masses displace fluid through its own fluid passageway and flow restricting means. Such an arrangement would have all of the proof masses integrating their own component of acceleration with the combined resulting fluid flow accumulating in the chamber 64 to displace piston 66. Under such an arrangement the scale factor would run from 100% to 173% as extremes.

An additional variation of the previously described arrangement would utilize a bias spring arrangement with the piston number 66 - similar to that used with the proof masses such as 28. This gives the piston 66 an equilibrium position to which it can return after any motion. The speed of this return will be controlled by the high resistance of the fluid leakage path formed by the clearance between the piston and the walls of the chamber 64. The action of such a mechanism will be to "erase" over a period of specified time, the effects of piston movement due to the acceleration integral. This procedure can prevent excessive piston movement due to a series of small vehicle flight path disturbances that occur over a long period of time. For such an arrangement, at the end of the piston travel, a magnetic or mechanical latch may be required to overcome the force of this bias spring.

Other improvements to the embodiment described and the suggested alternate arrangements will be apparent to those of skill in the art. The breadth of the invention is not to be controlled by the above description but rather by the scope of the claims which follow.

What is claimed is:

1. An apparatus for monitoring acceleration of a body comprising;
   (a) a casing having at least one cavity disposed in a predetermined relationship to the axes of the body when secured thereto;
   (b) a proof mass disposed in said cavity, said proof mass adapted to move in said cavity in response to an acceleration of the body for a period of time, said movement proportional to the time integral of said body acceleration;
   (c) damping fluid disposed in said cavity;
   (d) a first chamber including,
      (i) a first float member disposed therein,
      (ii) means for urging said float member from a first position in said chamber to a second position therein in a predetermined time,
      (iii) fluid, disposed in said chamber, said float member submerged in said fluid in a neutrally buoyant condition, such that said float member is insensitive to the acceleration of the body,
      (iv) fluid passage means connecting the portion of said chamber between said float member and one end thereof to the portion of said chamber disposed on the other side of said float member; and
   (e) means responsive to the movements of said proof mass and communicating with said float member such that the movement of said float member is interrupted if the time integral of the body acceleration exceeds a predetermined amount.

2. The apparatus of claim 1 wherein said casing includes a plurality of said cavities, said proof masses disposed in respective ones of said cavities, said means of paragraph (e) of claim 1 responsive to the movement of each said proof mass and communicating with said float member so as to interrupt the movement of said float member towards said second position if the time integral of said body acceleration represented by the movement of each said proof mass combines to exceed a predetermined amount.

3. The apparatus of claim 2 wherein said cavities are grouped in pairs, each cavity of each pair axially aligned, one with the other, and with an axis of the body when said casing is secured thereto said means of paragraph (d) of claim 1 including, means responsive to the movement in one direction only along the aligned axis of each said proof mass in each cavity of said pair.

4. The apparatus of claim 3 wherein there are three pairs of cavities, each pair of cavities axially aligned with a respective one of the principle axes of the body when secured thereto.

5. The apparatus of claim 1 wherein the body includes a centerline, certain ones of said cavities having an annular shape and disposed about said centerline in a predetermined circumferential relationship, whereby the corresponding proof masses are substantially insensitive to radial acceleration caused by the spin of the body about the centerline.

6. The apparatus of claim 1 further comprising means for equalizing the pressure conditions on either side of said proof mass before said apparatus is used to monitor the acceleration of the body, said pressure equalizing means made inoperative at such time it is desired to monitor said body acceleration.

7. The apparatus of claim 1 further comprising bias spring means interposed between said proof mass and each end of said cavity, said bias spring means exerting a sufficient force upon said proof mass to maintain said proof mass in a predetermined equilibrium position for a certain misalignment between said cavity and said predetermined relationship of said cavity to the axes of the body.

8. The apparatus of claim 1 wherein the means of paragraph (e) comprise:
  (a) check valve means communicating with the space between said proof mass and one end of said cavity, said check valve means responsive to the pressure differential thereacross whereby said damping fluid passes therethrough;
  (b) a second chamber including,
    (i) a second float member disposed therein, and
    (ii) fluid disposed in said chamber, said float member submerged in said fluid in a neutrally buoyant condition, such that said float member is insensitive to the acceleration of the body;
  (c) a first fluid passage means connected between said check valve means and the space between said second float member and one end of said second chamber;
  (d) a second fluid passage means connected to the space between said second float member and the opposite end of said second chamber and communicating with the space between said proof mass and the other end of said cavity;
  said second float member displaced from a first position in said second chamber towards a second position therein in response to the fluid pressure created thereupon by the movement of said proof mass and communicated thereto by said first and second fluid passage means; and
  (e) means responsive to the displacement of said second float member and communicating with said first float member to interrupt the movement of the latter if the time integral of the body acceleration exceeds said predetermined amount.

9. The apparatus of claim 8 wherein said check valve means is adapted to permit flow of said damping fluid from the corresponding cavity and through said first fluid passage means in one direction only.

10. The apparatus of claim 8 wherein said check valve means includes:
  (a) a ball member, said ball member equal in density to the density of said damping fluid, whereby said ball member is insensitive to the acceleration of the body; and
  (b) spring means for exerting a sufficient predetermined pressure upon said ball member, whereby said check valve means is closed to the flow of fluid therethrough until the force created in said cavity by the movement of said proof mass exceeds at least said predetermined pressure.

11. The apparatus of claim 8 wherein said first fluid passage means includes flow restricting means, said flow restricting means responsive to temperature whereby the effects of temperature on said damping fluid and on other elements of said apparatus are compensated for.

12. The apparatus of claim 8 wherein said casing includes a plurality of said cavities, said proof masses disposed in respective ones of said cavities, said apparatus further comprising a plurality of said check valve means, each of said check valve means communicating with a corresponding one of said cavities, said plurality of check valve means each connected to said first fluid passage means, whereby fluid flows through said first fluid passage means at any given time from only the one of said check valve means connected to said cavity wherein the proof mass is experiencing the greatest acceleration thereupon,
  said displacement of said second float member proportional to the combined movement of said proof masses.

13. The apparatus of claim 12 wherein said cavities are grouped in pairs, each cavity of each pair axially aligned, one with the other, and with an axis of the body when said casing is secured thereto.

14. The apparatus of claim 8 wherein the means responsive to the displacement of said second float member include an arm of said second float member, said arm extending into the path of movement of said first float member when said second float member reaches the second position in said second chamber.

15. The apparatus of claim 8 further comprising means for equalizing the pressure conditions on either side of said proof mass before said apparatus is used to monitor the acceleration of the body, said pressure equalizing means made inoperative before said monitoring takes place.

16. The apparatus of claim 15 further comprising a first and second releasing means cooperatively connected to said first and second float members, respectively, said first and second float members locked in their respective first positions by said releasing means until the latter frees said float members in response to an actuating signal, said pressure equalizing means made inoperative by said actuating signal.

17. The apparatus of claim 8 wherein said casing includes a plurality of said cavities, said proof masses disposed in respective ones of said cavities, said apparatus further comprising:
  (a) a plurality of said check valve means, each of said check valve means communicating with a corresponding one of said cavities; and
  (b) a plurality of said first fluid passage means, one for each of said check valve means and connected serially thereto, each of said first fluid passage means including flow restricting means, said flow restricting means responsive to temperature whereby the effects of temperature or said damping fluid and on other elements of said apparatus are compensated for.

18. The apparatus of claim 8 wherein the fluid passage means included in said first chamber includes flow restricting means, said flow restructing means responsive to temperature whereby the effects of temperature on said fluid in said first chamber and on other elements of said first chamber are compensated for.

19. The apparatus of claim 8 wherein said second chamber further includes bias spring means disposed therein and exerting a restoring a force upon said second float member so as to return said second float member to said first position after a displacement therefrom.

20. The apparatus of claim 1 wherein said fluid passage means includes flow restricting means, said flow restricting means responsive to temperature whereby the effects of temperature on said fluid in said first chamber and on other elements of said first chamber are compensated for.

21. An apparatus for monitoring the acceleration of a body comprising:
   (a) a casing having a plurality of cavities, said cavities grouped in pairs, each cavity of each pair axially aligned, one with the other, and with an axis of the body when said casing is secured thereto;
   (b) a plurality of proof masses disposed in corresponding ones of said cavities, said proof masses adapted to move in said cavity in response to an acceleration of the body for a period of time, said movement proportional to the time integral of said body acceleration;
   (c) damping fluid disposed in said cavities;
   (d) a first chamber including,
      (i) a first float member disposed therein,
      (ii) means for urging said float member from a first position in said chamber to a second position therein in a predetermined amount of time;
      (iii) fluid disposed in said chamber, said float member submerged in said fluid in a neutrally buoyant condition, such that said float member is insensitive to the acceleration of the body,
      (iv) fluid passage means connecting the portion of said chamber between said float member and one end thereof to the portion of said chamber disposed on the other side of said float member; and
   (e) means responsive to the movement of said proof masses and including,
      (i) check valve means communicating with the space between each of said proof masses and one end of each said cavity, said check valve means responsive to the pressure differential thereacross whereby said damping fluid passes therethrough,
      (ii) a second chamber including,
         (1) a second float member disposed therein, and
         (2) fluid disposed in said chamber, said float member submerged in said fluid in a neutrally buoyant condition, such that said float member is insensitive to the acceleration of the body,
      (iii) a first fluid passage means connected between each said check valve means and the space between said second float member and one end of said second chamber,
      (iv) a second fluid passage means connected to the space between said second float member and the opposite end of said second chamber and communicating with the space between each said proof mass and the other end of the corresponding cavity, said second float member displaced from a first portion in said second chamber towards a second position therein in response to the fluid pressure created thereupon by the movement of said proof masses and communicated thereto by said first and second fluid passage means, and,
      (v) means responsive to the displacement of said second float member and communicating with said first float member to interrupt the movement of the latter, if the time integral of the body acceleration exceeds said predetermined amount.

22. The apparatus of claim 21 wherein there are three pairs of cavities, each pair of cavities axially aligned with a respective one of the principal axes of the body when secured thereto.

23. The apparatus of claim 22 wherein the body includes a centerline, certain ones of said cavities having an annular shape and disposed about said centerline in a predetermined circumferential relationship, whereby the corresponding proof masses are substantially insensitive to radial acceleration caused by the spin of the body about the centerline.

* * * * *